United States Patent [19]

LaSota

[11] 4,417,268
[45] Nov. 22, 1983

[54] TELEVISION SIGNAL MONITORING DEVICE

[76] Inventor: Richard W. LaSota, 1272 Rolling Meadow Rd., Pittsburgh, Pa. 15241

[21] Appl. No.: 342,666

[22] Filed: Jan. 25, 1982

[51] Int. Cl.³ .............................................. H04N 9/62
[52] U.S. Cl. ....................................... 358/10; 358/139
[58] Field of Search .................................. 358/10, 139

[56] References Cited

U.S. PATENT DOCUMENTS

| | | |
|---|---|---|
| 3,972,065 | 7/1976 | Heiges, Jr. .............................. 358/10 |
| 4,153,911 | 5/1979 | Isono et al. ............................ 358/10 |
| 4,364,080 | 12/1982 | Vidovic ................................. 358/10 |

*Primary Examiner*—Richard Murray
*Attorney, Agent, or Firm*—Webb, Burden, Robinson & Webb

[57] ABSTRACT

An apparatus for monitoring parameters of television signals comprising an input circuit for receiving the composite video signal, a separating circuit for clamping the tips of the sync pulses at one reference level and repeatedly sampling the blanking level to establish a second reference level, a circuit for generating a first pulse suitable for input to digital logic circuits corresponding to the horizontal sync pulse, and a circuit for generating a second pulse suitable for input digital logic circuits corresponding to the video signal exceeding a preselected threshold measured from the said second reference level. A circuit generates a plurality of reference signals of fixed duration which signals are initiated by one of said first and second pulses and a circuit compares the fixed duration reference signals with said second pulse to generate error display signals. Preferably, a counting circuit clocked by said first pulse generates outputs indicative of particular video lines and is reset relative to the vertical sync pulses of the composite video signal.

30 Claims, 22 Drawing Figures

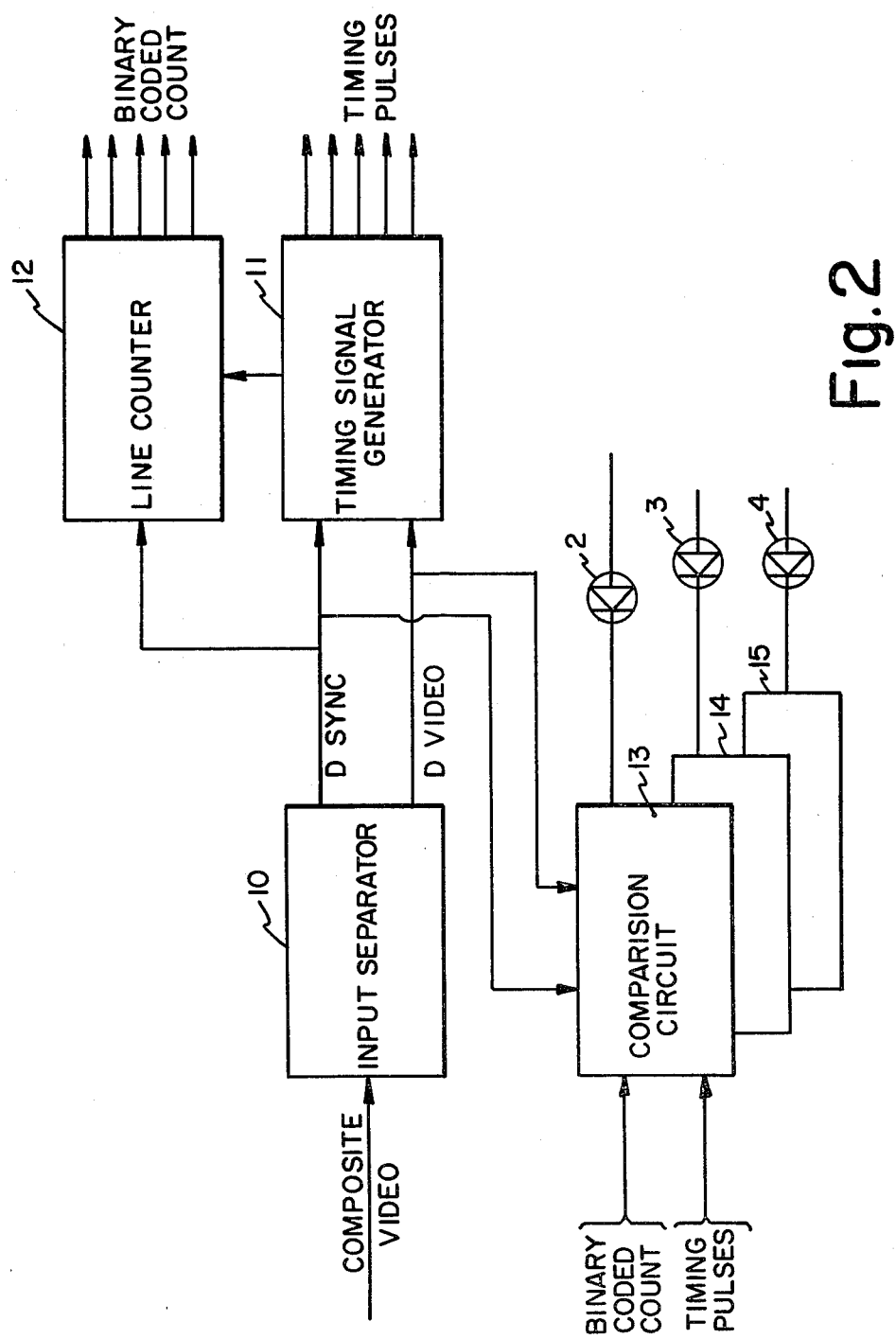

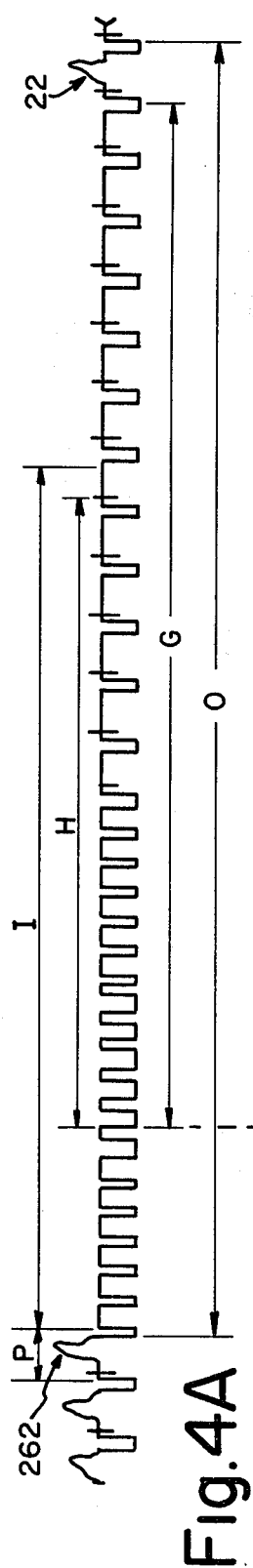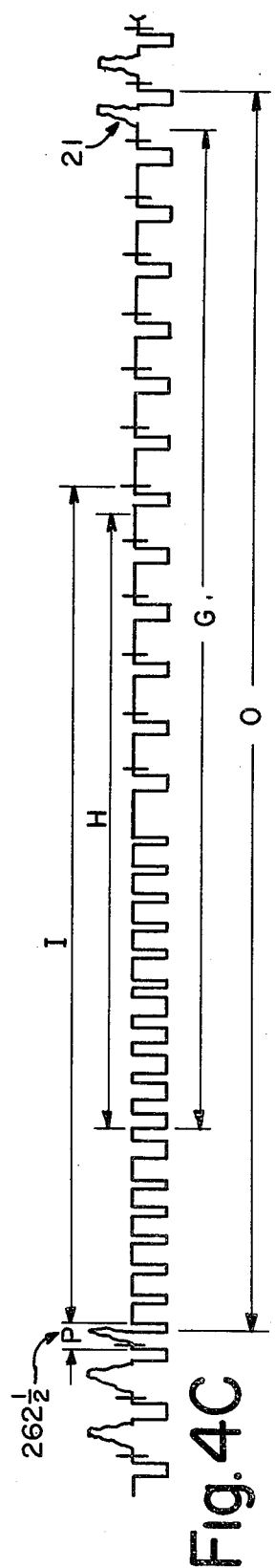
Fig.4A Fig.4B Fig.4C Fig.4D Fig.4E

TELEVISION SIGNAL MONITORING DEVICE

TECHNICAL FIELD

Governments issue specifications for the video signals transmitted within their jurisdictions. In the United States, the Federal Communication Commission issues the NTSC specifications for color television transmission. One part of the specifications relates to the vertical and horizontal blanking intervals. While expensive instruments are available that precisely measure these intervals between given lines or frames, no inexpensive apparatus for continuously monitoring the vertical and horizontal blanking intervals is available. It is an object according to this invention to provide just such an instrument.

The details of measuring vertical and horizontal blanking intervals with expensive equipment are explained, for example in, *Television Operational Measurements Video and RF for NTSC Systems*, First Edition, Tektronix, Inc. (1979). Terminology used in this patent application and well known in the art is often defined in that publication.

Horizontal blanking intervals should fall within the limits 10.49 and 11.44 microseconds and vertical blanking intervals should be a maximum of 21 lines to satisfy the NTSC specifications. Moreover, each blanking interval must be positioned correctly relative to sync (synchronization) signals.

DISCLOSURE OF INVENTION

Briefly according to this invention, there is provided an apparatus for monitoring parameters of television signals. The monitoring apparatus includes an input stage for receiving the composite video signal. In the first stage, the video signal is amplified and the tips of the sync pulses are clamped at one reference level. Repeatedly, the blanking level is sampled to establish a second reference level. The monitor apparatus further comprises a circuit for generating a first pulse suitable for input to digital logic circuits (hereinafter the D-sync signal) corresponding to the horizontal and vertical sync pulses of the composite video signal. Further, the monitoring apparatus includes a circuit for generating a second pulse suitable for input to digital logic circuits (hereinafter the D-video signal) corresponding to active video exceeding a preselected threshold measured from the second reference level. Preferably the threshold is adjustable between about two and twenty IRE.

The D-sync and D-video signals are then processed in timing pulse generating circuits to produce a plurality of reference pulses or signals of fixed duration which signals are initiated by either the D-sync or D-video pulses. Further, the D-sync signal is used to clock a counting device to generate digital outputs indicative of particular video lines in the raster. The counter is reset relative to the vertical sync pulses of the composite video signal.

The monitoring apparatus comprising at least one comparing circuit which compares the fixed duration reference signals and/or a signal indicative of the particular line in the raster with the D-video pulse to generate an error display signal based upon the comparison. The error display signal may be used to drive a display such as an LED.

An example of a comparison circuit in a monitoring apparatus according to this invention comprises the timing pulse circuit generating a long duration pulse approximately equal to the minimum required horizontal active video interval initiated on the leading edge of the D-video signal. The comparison circuit compares the long duration pulse with the trailing edge of the D-video signal to detect the presence of video following the long pulse. Such presence is indicative of a horizontal blanking width less than the maximum allowed.

Another example of a comparison circuit in a monitoring apparatus according to this invention comprises decoding the output of the counter indicative of the last line or the last one-half line of a field of a raster and comparing to the D-video pulse and if the D-video pulse is not detected the result is indicative of the vertical blanking interval beginning too soon.

BRIEF DESCRIPTION OF THE DRAWINGS

Further features and other objects and advantages of this invention will become clear from the following detailed description made with reference to the drawings.

FIG. 2 is a schematic diagram illustrating the basic subcircuits of a monitoring apparatus according to this invention;

FIG. 4A shows the composite video just before, during and after the vertical blanking interval associated with field 1;

FIG. 4B illustrates the field pulses generated corresponding to the vertical sync pulses shown in FIG. 4A;

FIG. 4C shows the composite video signal just before, during and just after the vertical blank interval corresponding to field 2;

FIG. 4D shows the field pulses generated corresponding to field 2;

FIG. 4E shows the frame pulse corresponding to the beginning of field 2 (FIG. 4C);

DESCRIPTION OF PREFERRED EMBODIMENTS

Figure 1:
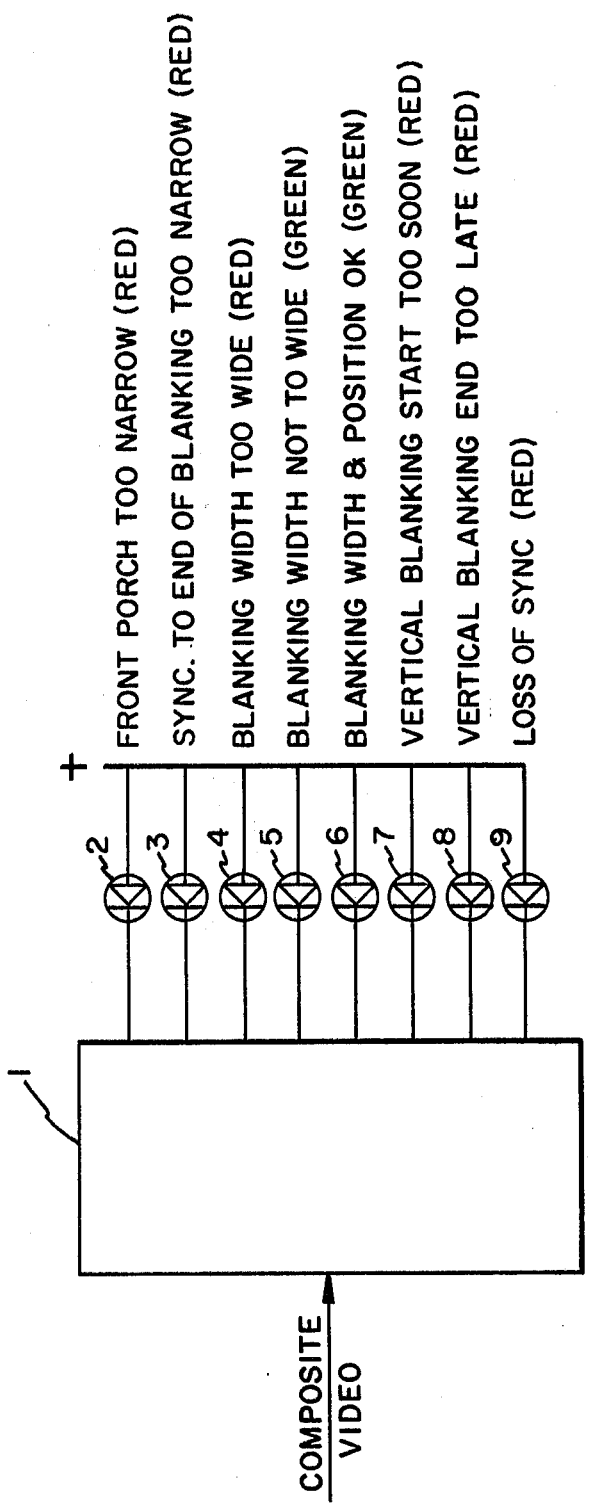
FIG. 1 is a schematic drawing illustrating the inputs and outputs to a monitoring apparatus according to this invention.

FIG. 1 illustrates the inputs and outputs to the monitor 1 according to this invention. The input is the composite video signal, for example, a signal suitable for modulating a transmitter and complying with the NTSC standards of the FCC. The invention could, of course, be embodied to monitor television signals complying with other standards. The component video signals are explained hereafter with reference to FIGS. 3A, 4A, and 4C. The outputs of the monitor activate displays such as LED displays, including one or more of the displays 2 to 8 indicated on FIG. 1 and optionally the loss of sync display 9. Red LED displays are used herein to indicate "fault" conditions and green displays "all-is-well" conditions. Specifically the horizontal blanking interval is continuously monitored and red LED 2 lights when the front porch interval of the video signal is too narrow, red LED 3 lights when the interval between the start of sync and the end of the blanking is too narrow (if both LEDs 2 and 3 are lit, the horizontal blanking width is too narrow since it is the sum of the front porch and the sync to end of blanking intervals), red LED 4 lights when the blanking width is too wide, green LED 5 lights when the blanking widthh is not too wide, green LED 6 lights when the blanking width is not to wide and at a nominal position with respect to the horizontal sync pulse of the composite video signal. Every active line is monitored for the above parameters and through the use of logic gates and counters the LEDs indicate the "average" measurement over a period of time. This operation is basically different from devices designed to automatically measure waveform parameters where samples are taken at random and/or intermittently of individual lines. The vertical blanking interval is continuously monitored by two LED indicators. Red LED 7 lights if no video is present during any portion of horizontal lines 262/262-1/2, and red LED 8 lights if no video is present during a portion of horizontal line 22/21. As used herein, line "262/262-b 12" means last full line of field 2 or last one-half line of field 1. Line "22/21" means line 22 of field 1 or line 21 of field 2. Optionally, the loss of sync LED (red) 9 lights for loss of proper sync signals.

Referring now to FIG. 2, the schematic flow or block diagram of a monitor according to this invention is illustrated. The composite video signal is processed in the input separator 10 to provide two pulses that may be processed by digitial circuits (for example TTL logic). The D-sync signal is off (low) during the horizontal and vertical pulses of the composite video (see FIGS. 3C and 3D). The D-video signal is on (high) during active video (see FIG. 3B). The D-video and D-sync signals are used to initiate a plurality of timing pulses in the timing signal generator 11. One pulse out of the generator 11 is indicative of the vertical sync pulses for resetting the line counter 12. The vertical sync pulses (see FIG. 3D) being much longer than the horizontal sync pulses, digital detection is not difficult. The line counter is clocked by the D-sync pulse and outputs a binary coded count on a multiple line bus.

The outputs of the line counter 12, timing signal generator 11, and input separator 10 are fed to a plurality of comparison circuits (only 13, 14, 15 shown on FIG. 2) which generate fault or all is well signals for output to displays, such as LEDs, (only 2, 3, 4 shown). Each comparison circuit is designed to monitor an aspect of the composite video signal, for example, as fully explained with reference to FIG. 1.

Figure 3A:
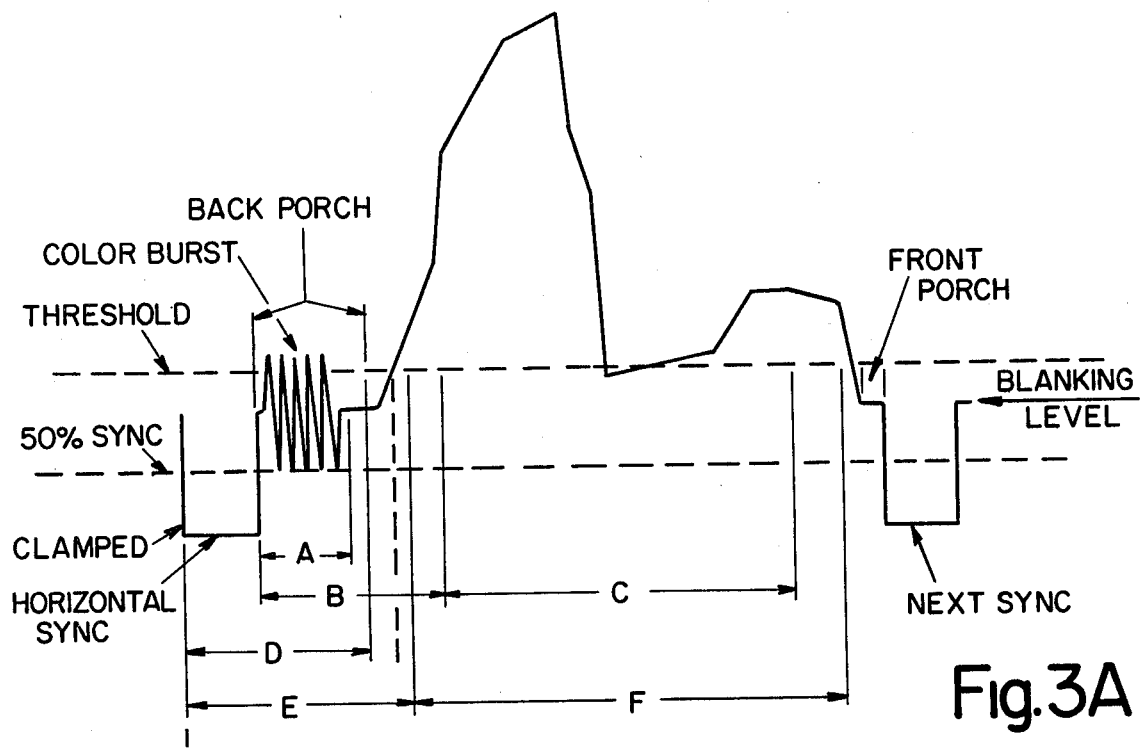
FIG. 3A illustrates a portion of the composite video signal during approximately one line interval and further shows the position and duration of a number of the reference pulses described herein.
Figure 3B:
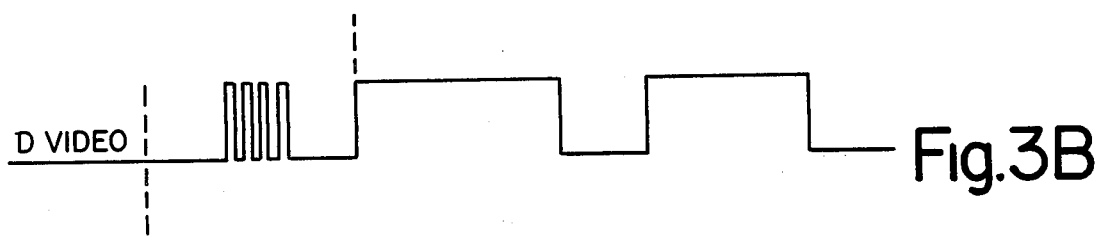
FIG. 3B illustrates the D-video signal corresponding to the composite video shown in FIG. 3A.
Figure 3C:
FIG. 3C shows the D-sync signal corresponding to the composite video shown in FIG. 3A.
Figure 3D:
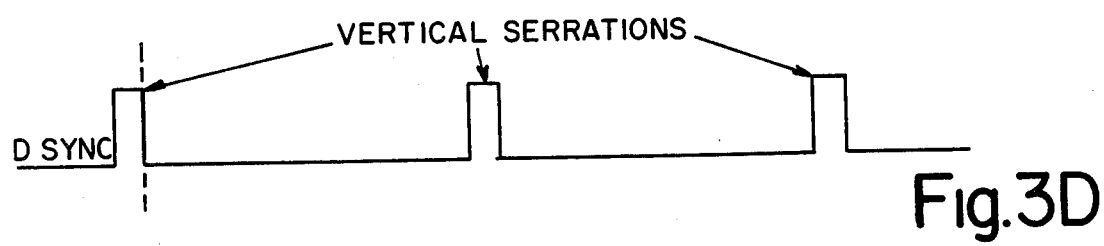
FIG. 3D shows the D-sync signal during the vertical sync pulse intervals.
Figure 5:
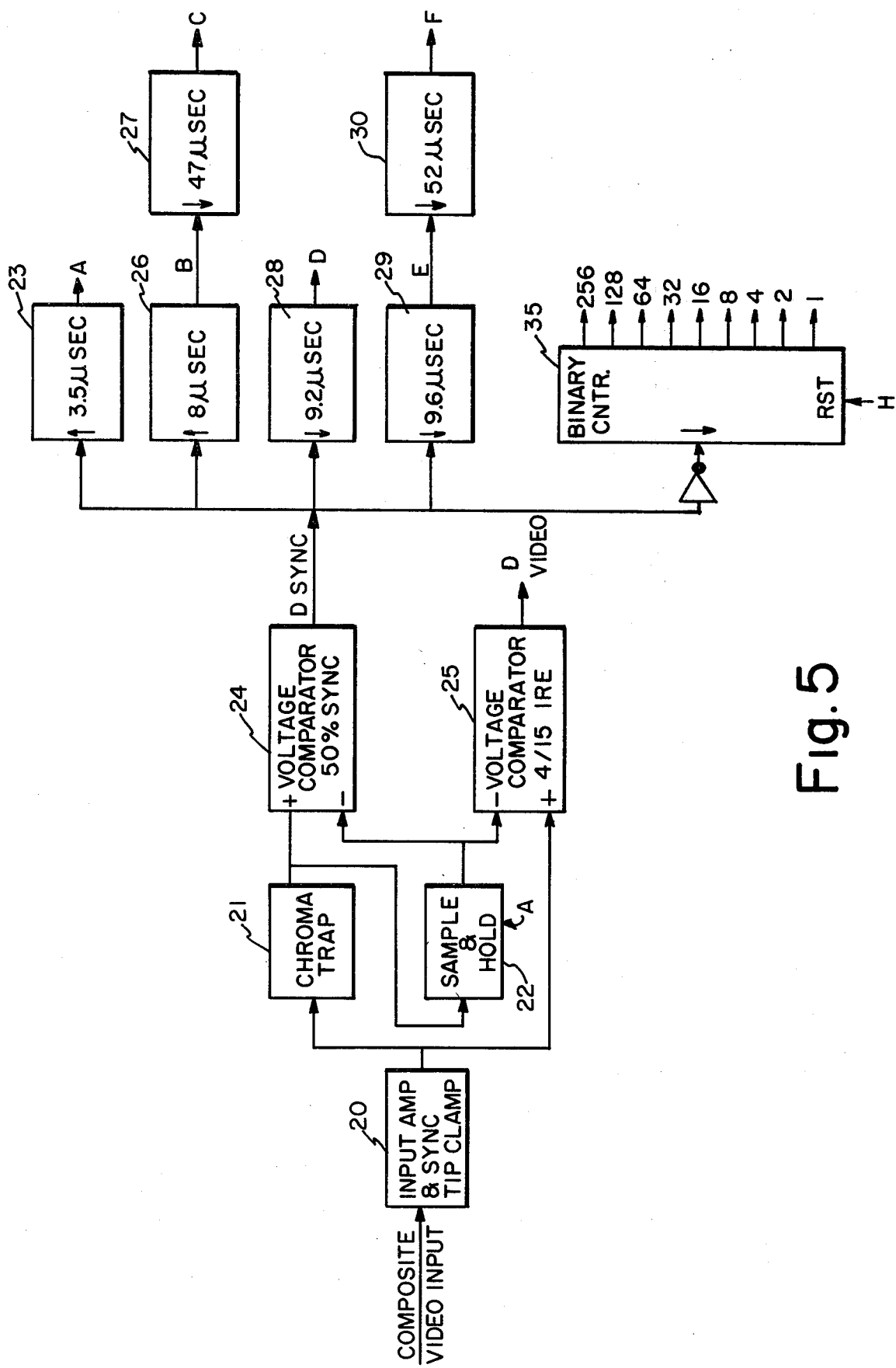
FIGS. 5, 6, 7, and 8 illustrate the input processor and timing generator.
Figure 6:
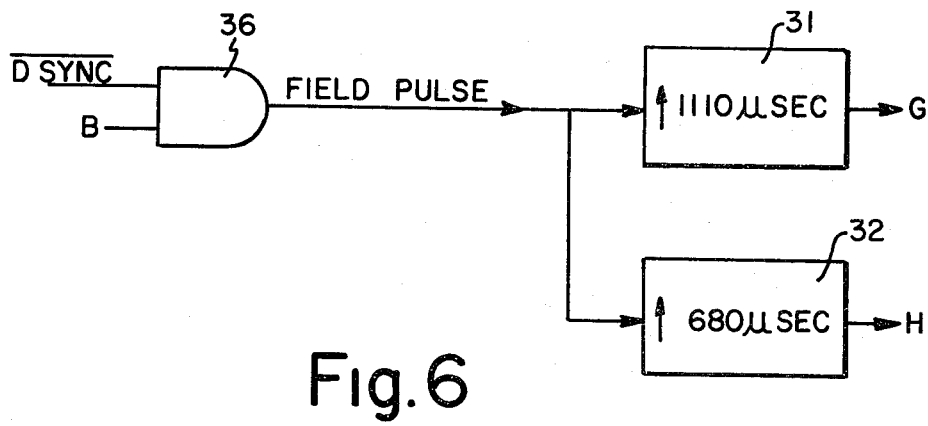
Figure 7:
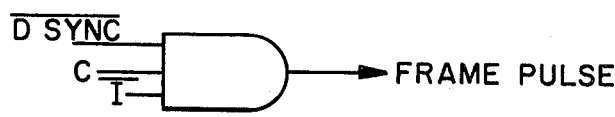
Figure 8:
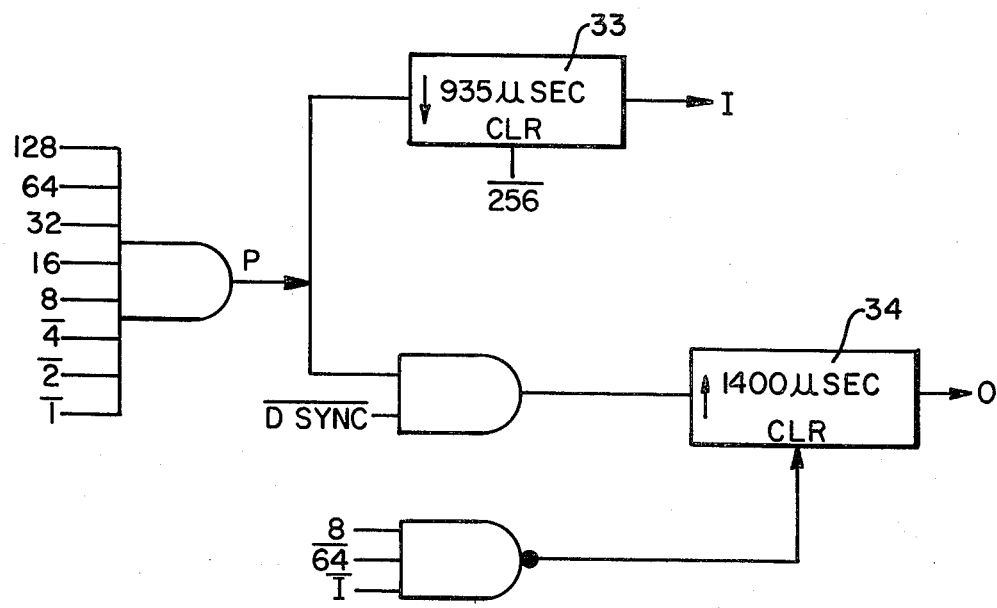

Referring now to FIG. 3A, the composite video signal for one line scan during the active picture interval is illustrated. To those skilled in the art, the various portions, such as sync pulse, color burst, back porch, active video interval and front porch are well understood. For nominal line scan, the total duration of the sync pulse, front porch (blanking), active video, and back porch (blanking) is approximately sixty-three (63) microseconds under the NTSC standards. A number of timing pulses may be generated by the timing signal generator 11 according to preferred aspects of this invention. The derivation of these pulses (A, B, C, D, E, F) relative to the line scan is illustrated in FIG. 3A by the double ended arrows. The D-video and D-sync signals of FIGS. 3B, 3C, and 3D are positioned under FIG. 3A to show the correspondence in timing.

FIG. 4A shows the composite video during vertical blanking associated with field 1. FIG. 4B illustrates field pulses, generated by the circuits described hereafter, corresponding to the vertical sync pulses. FIG. 4C shows the composite video during vertical blanking associated with field 2. FIG. 4D, as FIG. 4B, shows field pulses. FIG. 4E shows a frame pulse generated by the circuits to be described for marking with a digital signal the start of a frame in a composite video signal being monitored. The duration and position of four long pulses (G, H, I, and O) and the one short pulse (P) generated by the timing signal generator 11 or the like and useful in the preferred aspects of this invention are shown by double headed arrows on FIGS. 4A and 4C.

Referring now to FIGS. 5, 6, 7, and 8 which are more detailed schematics of portions of the input processor and line counter circuits, the composite video is amplified by input stage 20 (say 6 dD) and the base of the sync pulses are clamped to ground potential. Circuits for both are well known. The clamped video is passed to chroma trap 21 where the color burst is removed from the back porch. The output of the chroma trap is passed to sample and hold circuit 22. The sampling interval is controlled by the input of pulse A from one shot multivibrator 23. The output of the sample and hold circuit is a second reference level.

After passing through a chroma trap, sync pulses are separated by a voltage comparator 24 operating at the fifty (50) percent sync level. D-video is developed by a second voltage comparator 25 operating at a selected video level. Sampling the input signal during the back porch interval and using the voltage as one input to the voltage comparators enables operation with variations in sync level. Various timing pulses are developed from sync using monostable multivibrators (23, 26 to 34).

The D-sync pulse clocks binary couner 35. It is reset by pulse H which itself is timed by vertical sync pulses identified by AND gate 36.

Figure 9:
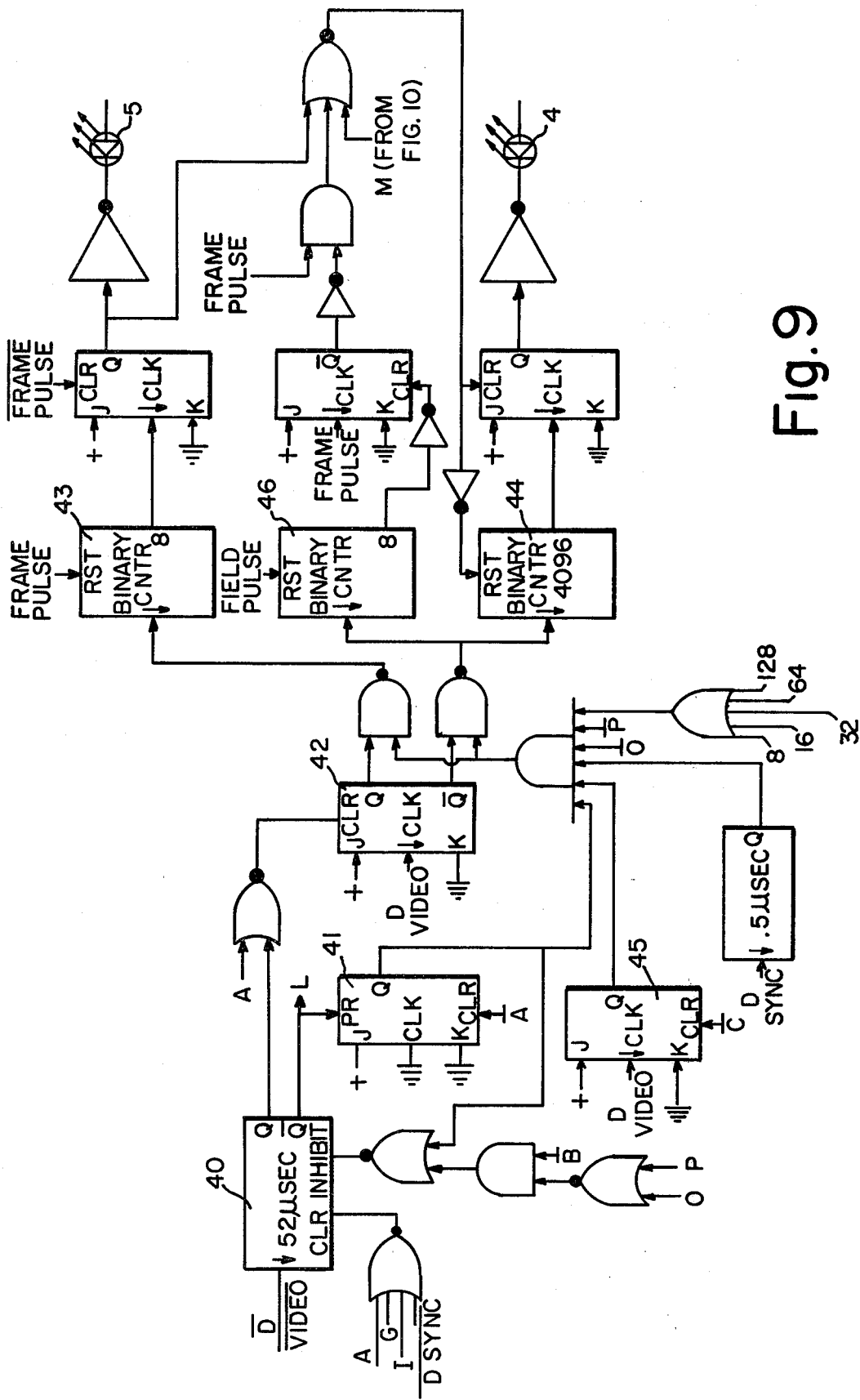
FIG. 9 illustrates the comparison circuit for detecting horizontal blanking width not too wide.

Referring now to FIG. 9, a comparison circuit for monitoring horizontal blanking width is described. A pulse of fifty-two (52) microseconds is generated from the leading edge of the D-video in monostable multivibrator 40. The pulse is prevented from being triggered during vertical blanking by pulses G and I. Pulse A and D-sync, also fed to the clear input, make sure that the fifty-two (52) microsecond pulse is ready to be triggered by the leading edge of D-video. Pulse B fed into the inhibit input sets a limit on the maximum blanking width that will be measured (back porch very excessive), except during lines 22/21 and 262/262-1/2 (pulses O and P), when no limit is set. The fifty-two (52) microsecond pulse is prevented from being triggered a second time during a single line by feeding, through the inhibit input, the output of a JK flip-flop 41 preset by the fifty-two (52) microsecond pulse and cleared by pulse A. The fifty-two (52) microsecond pulse output, also pulse A, is used to clear a JK flip-flop 42. The presence of video following the fifty-two (52) microsecond pulse is detected by using D-video as the clock to JK flip-flop 42. The presence of the D-video (i.e. clocking of flip-flop 42) indicates a horizontal blanking interval which is not too wide. The output of JK flip-flop 42 is combined with other logic to light LEDs 4 and 5 in the following manner: LED 5 lights after sixteen (16) lines (counted by counter 43) with horizontal blanking that is not too wide are measured. This circuit is cleared once every frame. LED 4 lights after 4096 lines (counted by counter 44) with wide horizontal blanking are detected. Limits are set for maximum horizontal blanking measured; pulse B (very exccessive back porch) and pulse C with associated JK flip-flop 45 (very exccessive front porch). The circuit is cleared if LED 5 lights or less than eight (8) lines (counted by counter 46) with wide blanking are detected in a single field or if the horizontal blanking position circuit indicated proper blanking position.

Figure 10:
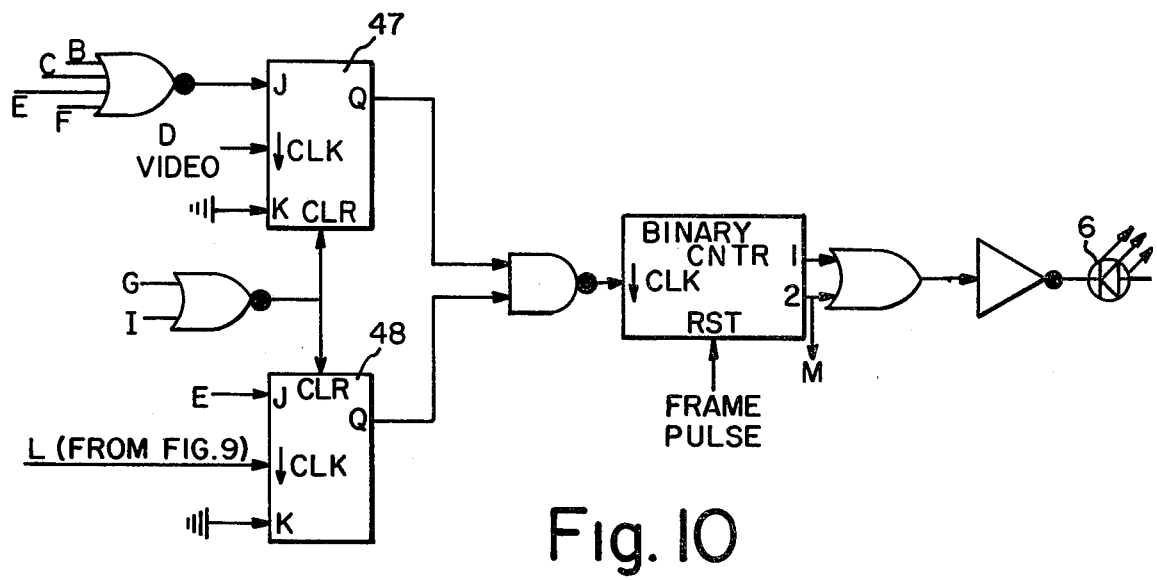
FIG. 10 illustrates the comparison circuit for determining the nominal position of the horizontal blanking interval.

Referring now to FIG. 10, a comparison circuit for monitoring position of the horizontal blanking interval is described. The horizontal blanking position circuit makes use of the fact that horizontal blanking is constant within a single field. The start of horizontal blanking is detected by the presence of video during a selected front porch interval (input J to flip-flop 47). The end of the horizontal blanking is detected by detecting the leading edge of video during a selected back porch interval (input J to flip-flop 48). Both JK flip-flops 47 and 48 are cleared during vertical blanking. The LED 6 lights when the desired start and end of horizontal blanking is detected for any line within the same field, not necessarily the same line for both measurements. The counter permits the LED 6 to light after one field and be cleared once every frame (stops the LED from flickering). The counter also permits the detection of proper horizontal blanking for both fields within a frame before clearing horizontal blanking LED 4.

Figure 11:
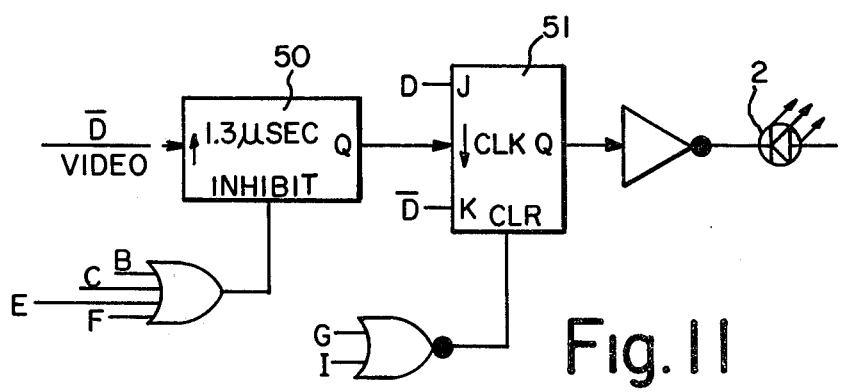
FIG. 11 illustrates the comparison circuit for detecting the front porch to be too narrow.

Referring now to FIG. 11, a comparison circuit for monitoring the front porch interval is described. The front porch circuit makes use of a retriggerable monostable multivibrator 50. The retriggerable monostable multivibrator is triggered or retriggered by any trailing edge of the D-video input. The retriggerable monostable multivibrator is inhibited from triggering except during a nominal front porch interval. The retriggerable monostable multivibrator 50 has a duration of minimum front porch (1.3 microseconds). The output is used as a clock to JK flip-flop 51. The J and K inputs to flip-flop 51 are representative of sync. If the clock input ends after the start of sync JK flip-flop 51 is switched lighting the LED 2 indicating front porch is too narrow. The LED is extinguished when front porch is over 1.3 microseconds. JK flip-flop 51 is prevented from switching during vertical blanking by pulses G and I. The retriggerable monostable multivibrator 50 is also triggered by the trailing edge of the inhibit pulse and the LED also lights if the nominal front porch interval is set less than 1.3 microseconds. A similar use of a retriggerable monostable multivibrator might be employed in the horizontal blanking width circuit previously described permitting the blanking width to be measured directly.

Figure 12:
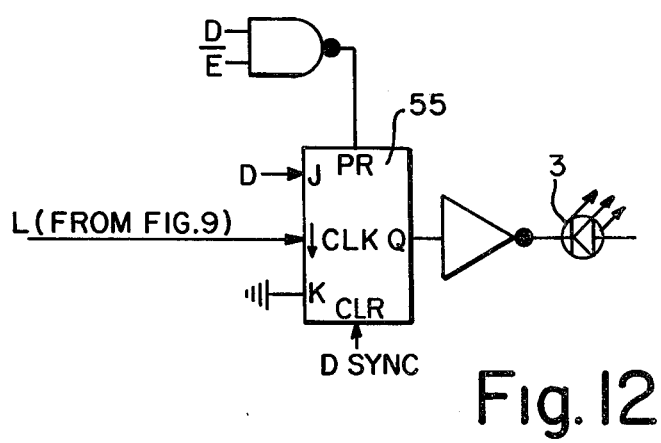
FIG. 12 illustrates the comparison circuit for detecting the start of sync to end of blanking interval too narrow.

Referring now to FIG. 12, a comparison circuit for monitoring start of sync to end of blanking interval is described. The clock input to the JK flip-flop 55 is representative of the leading edge of the video. The J input is a pulse of minimum sync to end of blanking duration (9.2 microseconds). If the JK flip-flop 55 is clocked before the 9.2 microsecond pulse times out, LED 3 lights, indicating sync to end of blanking width is too narrow. The pulse fed into the preset input presets the JK flip-flop 55 if the nominal sync to end of blanking interval is set less than 9.2 microseconds, also lighting the LED. The circuit is cleared by each sync pulse.

Figure 13:
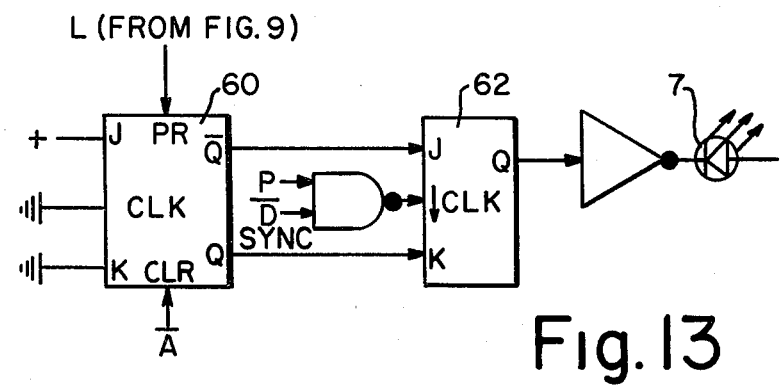
FIG. 13 illustrates the comparison circuit for detecting the vertical blanking start too soon.

Referring now to FIG. 13, a comparison circuit for monitoring vertical blanking is described. The JK flip-flop 60 is preset by the leading edge of the video, of which pulse L is representative of and cleared by pulse A. The clock input to JK flip-flop 62 is equivalent to the first equalizing pulse in field 1 or 2. The JK flip-flop 62 output goes high when clocked if no video was present during line 262/262-1/2, lighting the LED 7 to indicate vertical blanking started too soon. If video was present during line 262/262-1/2, the Q output goes low extinguishing the LED.

Figure 14:
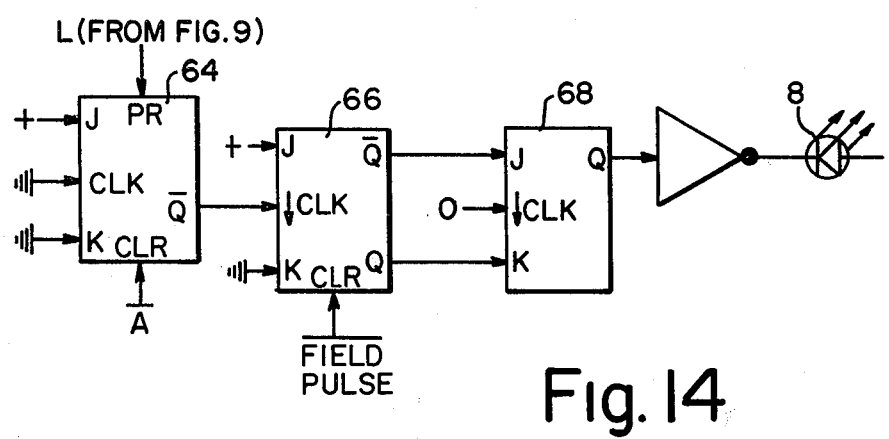
FIG. 14 illustrates the comparison circuit for detecting the vertical blanking signal ending too late.

Referring now to FIG. 14, another comparison circuit for monitoring vertical blanking is described. The JK flip-flop 64 is preset by the leading edge of video, of which pulse L is representative, and cleared by pulse A. The JK flip-flop 66 stores the Q output so that the vertical blanking measurement can be made during the horizontal sync interval. The clock pulse to the JK flip-flop 68 times out following the desired vertical blanking measurement. The JK flip-flop 68 Q output goes high when clocked if no video is present during line 22/21, lighting LED 8 to indicate vertical blanking ended too late. If video was present during line 22/21 the Q output goes low extinguishing LED 8.

Figure 15:
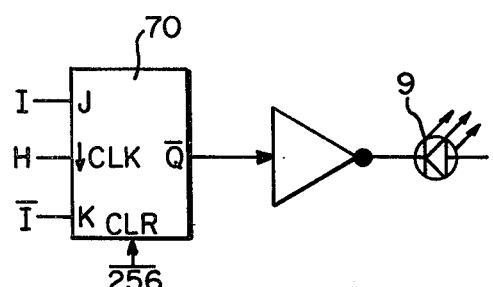
FIG. 15 illustrates a circuit to detect the presence of a proper sync signal.

Referring now to FIG. 15, a circuit for detecting proper sync is described. The clock input to JK flip-flop 70 normally ends before the J and K inputs. If the J and K inputs end before the clock pulse, caused by improper sync clocking of the binary counter in the timing pulse generator circuit, the Q output goes high lighting the LED 9. The LED 9 is extinguished when normal sync is present. The binary counter and the timing pulse generator circuit (FIG. 5) normallyy doesn't reach a count of 256. If a count of 256 is reached the LED 9 also lights.

According to a preferred embodiment of my invention that has been constructed and tested with success, all of the above comparison circuits are provided. However, a useful monitor might comprise less than all of the above described comparison circuits.

Having thus described my invention with the detail and particularity required by the Patent Laws, what is desired protected by Letters Patent is set forth in the following claims.

1. An apparatus for monitoring parameters of television signals comprising:
input circuit means for receiving the composite video signal,
separating circuit means for clamping the tips of the sync pulses at one reference level and repeatedly sampling the blanking level to establish a second reference level, means for generating a first pulse suitable for input to digital logic circuits corresponding to the horizontal and vertical sync pulse, and means for generating a second pulse suitable for input to digital logic circuits corresponding to the video signal exceeding a preselected threshold measured from the said second reference level.

2. Apparatus according to claim 1 wherein the preselected threshold is adjustable between about two and twenty IRE.

3. Apparatus according to claim 1 further comprising: circuit means for generating a plurality of reference signals of fixed duration which signals are initiated by one of said first and second pulses.

4. Apparatus according to claim 3 further comprising: circuit means for comparing the fixed duration reference signals with said second pulse to generate error display signals based upon the comparison.

5. Apparatus according to claim 4 for counting the number of error and/or all-is-well signals within a field or frame and outputting a signal for activation or display dependent upon whether the number of signals is above or below a preselected sensitivity count.

6. Apparatus according to claim 5 wherein the count exceeds about four signals per field.

7. Apparatus according to claim 4 wherein:
a long duration pulse approximately equal in duration to the minimum horizontal active video interval is generated from the leading edge of said second pulse, and is compared with the trailing edge of second pulse to detect the presence of video following the long pulse which is indicative of a horizontal blanking width less than the maximum allowed.

8. Apparatus according to claim 7 in which the long pulse is approximately 52 microseconds in duration.

9. Apparatus according to claim 7 further comprising apparatus for causing disregard of comparisons during the vertical blanking interval.

10. Apparatus according to claim 7 wherein if the second pulse does not commence within a preselected interval relative to sync the comparison is ignored.

11. Apparatus according to claim 7 wherein if the second pulse does not terminate after a preselected interval relative to sync the comparison is ignored.

12. Apparatus according to claim 3 further comprising:
counting means clocked by said first pulse for generating outputs indicative of particular video lines and wherein said counter is reset relative to the vertical sync pulses of the composite video signal.

13. Apparatus according to claim 12 further comprising:
circuit means for comparing the fixed duration reference signals with said second pulse to generate error display signals based upon the comparison.

14. Apparatus according to claim 13 wherein an output of the counter indicative of the last line or the last one-half line of a field is compared to the second pulse and if the second pulse is not detected the result is indicative of the vertical blanking interval beginning too soon.

15. Apparatus according to claim 13 wherein a very long pulse just longer than the vertical blanking interval is initiated by a pulse derived from said counter being indicative of the start of the field, and wherein the end of said very long pulse is compared with said second pulse and if the second pulse is not detected before the end of the long pulse the result is indicative of an excessive duration for the vertical blanking interval.

16. Apparatus according to claim 15 wherein the very long pulse is about 1400 microseconds in duration.

17. Apparatus according to claim 15 further comprising apparatus for causing disregard of comparison during horizontal lines containing test signals during the vertical blanking interval.

18. Apparatus according to claim 12 further comprising apparatus for detecting proper counting which is indicative of a normal sync signal.

19. Apparatus according to claim 4 wherein a short pulse approximately equal in duration to the minimum front porch interval is generated from the trailing edge of the said second pulse and is compared with a third pulse signal commencing on the leading edge of said first pulse signal, to detect the presence of the short pulse during the third pulse which is indicative of a front porch interval too narrow.

20. Apparatus according to claim 19 wherein the short pulse is about 1.3 microseconds in duration.

21. Apparatus according to claim 19 further comprising apparatus for causing disregard of comparisons during the vertical blanking interval.

22. Apparatus according to claim 19 further comprising apparatus for detecting when the internal nominal front porch interval is less than the minimum front porch interval.

23. Apparatus according to claim 4 wherein a third pulse of duration somewhat greater than the duration of the minimum start of sync to end of horizontal blanking interval is activated relative to said first pulse and a fourth pulse of duration somewhat greater than the minimum front porch interval is activated relative to said first pulse and wherein the start of said second pulse is compared to a third pulse and the end of said second pulse is compared to said fourth pulse and wherein the start of said second pulse during the said third pulse and the end of said second pulse during the said fourth pulse is indicative of nominal positioning of the horizontal blanking signal.

24. Apparatus according to claim 23 further comprising apparatus for causing disregard of comparisons during the vertical blanking interval.

25. Apparatus according to claim 23 further comprising apparatus for storing the comparison made by the said third pulse and/or the said fourth pulse permitting indication of nominal positioning of the horizontal blanking signal by comparison made by the said third pulse and the said fourth pulse being of the same or separate horizontal line.

26. Apparatus according to claim 12 or 23 further comprising apparatus for detecting when the internal nominal sync to end of blanking interval is less than the minimum sync to end of blanking interval.

27. Apparatus according to claim 23 wherein the third pulse has a duration of approximately 9.6 microseconds and the fourth pulse has a duration of approximately 1.8 microseconds.

28. Apparatus according to claim 4 wherein a third pulse about equal in duration to the minimum sync to end of blanking period is compared with the leading edge of the second pulse, wherein the second pulse starting before the end of the third pulse is indicative of a sync to end of the blanking interval too narrow.

29. Apparatus according to claim 28 wherein the third pulse has a duration of approximately 9.2 microseconds.

30. Apparatus according to claim 1 further comprising: circuit means for causing disregard of second pulse corresponding to the color burst.

* * * * *

UNITED STATES PATENT AND TRADEMARK OFFICE
CERTIFICATE OF CORRECTION

PATENT NO. : 4,417,268

DATED : November 22, 1983

INVENTOR(S) : Richard W. LaSota

It is certified that error appears in the above-identified patent and that said Letters Patent are hereby corrected as shown below:

Column 2 Line 44 "blank" should read --blanking--.

Column 3 Line 41 "b 12" should read --1/2--.

Column 6 Line 48 "normallyy" should read --normally--.

Claim 22 - Column 8 Line 22 "claim 19" should read --claim 19 or 23--.

Column 8, line 49, claim 26, "claim 12" should read --claim 28--.

Signed and Sealed this

Fifth Day of February 1985

[SEAL]

Attest:

DONALD J. QUIGG

Attesting Officer     Acting Commissioner of Patents and Trademarks